United States Patent
Tomita et al.

[11] Patent Number: 6,115,153
[45] Date of Patent: Sep. 5, 2000

[54] REFLECTION-TYPE HOLOGRAM SCALE AND OPTICAL DISPLACEMENT MEASURING APPARATUS THEREWITH

[75] Inventors: Masaki Tomita; Motohiro Osaki; Kuniaki Obata; Masaaki Miyashita, all of Kawasaki, Japan

[73] Assignee: Mitutoyo Corporation, Kawasaki, Japan

[21] Appl. No.: 09/414,417

[22] Filed: Oct. 8, 1999

[30] Foreign Application Priority Data

Oct. 19, 1998 [JP] Japan .................................. 10-297423

[51] Int. Cl.[7] .............................. G02B 5/32; G02B 5/18; G01B 11/02

[52] U.S. Cl. ...................... 359/15; 359/572; 250/237 G; 356/356

[58] Field of Search .............................. 359/15, 572, 576, 359/566; 356/356, 355, 354; 250/237 G, 231.16

[56] References Cited

U.S. PATENT DOCUMENTS 5,258,861  11/1993  Tsuchiya .
5,377,044  12/1994  Tomono et al. .

FOREIGN PATENT DOCUMENTS 0 390 092 A2  10/1990  European Pat. Off. .
0 390 092 A3  10/1990  European Pat. Off. .
5-232318       9/1993  Japan .
6-300520      10/1994  Japan .
8-5328         1/1996  Japan ..................................... 356/356

Primary Examiner—Jon Henry
Attorney, Agent, or Firm—Oliff & Berridge, PLC

[57] ABSTRACT

A holographic grating 12 is formed on one surface of a scale substrate 11 in such a manner that a light source is disposed over the other surface of the scale substrate 11. The scale substrate 11 is formed of a transparent material. A reflection film 13 is directly deposited on the grating surface. A protection substrate 15 is adhered to the reflection film 13 on the scale substrate 11 with adhesive agent 14. Thus, a reflection-type hologram scale 1 is accomplished.

4 Claims, 3 Drawing Sheets

REFLECTION-TYPE HOLOGRAM SCALE AND OPTICAL DISPLACEMENT MEASURING APPARATUS THEREWITH

BACKGROUND OF THE INVENTION

1. Field of the Invention

The present invention relates to a reflection-type hologram scale and an optical displacement measuring apparatus therewith.

2. Description of the Related Art

As conventional ultra-high-performance optical displacement measuring apparatuses, a system that detects the variation of an interference state corresponding to the movement of a scale that is a diffraction grating is known. As an example of a diffraction grating scale for use with such an optical displacement measuring apparatus, a hologram scale using a holographic grating is known.

Generally, there are two types of diffraction gratings—transmission type and reflection type. In a scale having the transmission type diffraction grating, a light source and a detector are disposed on both sides of the scale. In a scale having the reflection type diffraction grating, a light source and a detector are disposed on the same side of the scale. It is said that while the reflection type scale is suitable for a compact apparatus, the transmission type scale is suitable for a high-performance apparatus.

A reflection-type hologram scale having a transmission-type holographic grating and a reflection film has been proposed (see Japanese Patent Laid-Open Publication Nos. 5-232318 and 6-300520). For example, in the related art reference disclosed in Japanese Patent Laid-Open Publication No. 5-232318, (1) a technology for structuring a reflection-type hologram scale by adhering a scale substrate having a holographic grating and a protection substrate having a reflection film with adhesive agent (see FIG. 5), and (2) a technology for structuring a reflection-type hologram scale by forming a reflection film on a scale substrate, directly forming a holographic grating on the reflection film, and adhering a protection substrate on the surface of the holographic grating with adhesive agent.

In the case of (1) reflection-type hologram scale, since an adhesive agent layer is disposed between the holographic grating and the reflection film, unnecessary diffraction light is superimposed as noise. In other words, as shown in FIG. 5, when one incident coherent light beam enters a holographic grating, a 0-th order light component and a 1-st order diffraction light component are reflected by the reflection film through different optical paths. These reflected light components enters the holographic grating. The holographic grating diffracts these light components. Thus, as shown in FIG. 5, two 1-st order diffraction light components are obtained.

When the thickness of the adhesive agent layer is smaller than the diameter of the incident light beam, the two diffraction light components overlap and interfere with each other. Thus, the two diffraction light components are detected as one light beam. If the thickness of the adhesive agent layer is not equal in the longitudinal direction of the scale, a phase difference corresponding to the thickness of the adhesive agent layer takes place between the two diffraction light components. Corresponding to the phase difference, the resultant light beam varies in the interference light intensity and phase. Thus, when the reflection-type hologram scale is used for a displacement measuring apparatus, due to a variation of the signal intensity and a phase variation regardless of the grating constant, a displacement read error will take place.

To prevent such a displacement read error, it is necessary to suppress the deviation of the thickness of the adhesive agent layer against the wavelength of the incident light or to electrically compensate a detected signal. However, it is practically difficult to perform these methods. In the reflection-type hologram scale of type (2), since a holographic grating contacts a reflection film, such a problem does not take place. However, when a holographic grating is formed on a reflection film, another problem will take place. As shown in FIG. 6, a holographic grating is formed by recording interference fringes of two plane waves A and B on a hologram photosensitive layer. However, when a reflection film is disposed as a base layer of the hologram photosensitive layer, as shown in FIG. 7, interference fringes of the plane wave A and its reflection wave A' take place. The interference fringes are also recorded in the direction of the thickness of the hologram photosensitive layer. In addition, interference fringes of the reflection waves of the plane waves A and B also take place.

In other words, in the reflection-type hologram scale of type (2), along with the interference fringes of the plane waves A and B that are necessary for forming a hologram, unnecessary interference fringes take place. The unnecessary interference fringes are recorded on the hologram photosensitive layer. The unnecessary interference fringes are (a) the interference fringes of the incident light of the plane wave A and its reflection light, (b) the interference fringes of the incident light of the plane wave B and its reflection light, (c) the interference fringes of the reflection light of the plane wave A and the reflection light of the plane wave B, (d) the interference fringes of the reflection light of the plane wave A and the incident light of the plane wave B, and (e) the interference fringes of the reflection light of the plane wave B and the incident light of the plane wave A. These unnecessary interference fringes cause the diffraction efficiency to lower and fluctuate. Thus, the displacement of a measurement object cannot be accurately read.

SUMMARY OF THE INVENTION

An object of the present invention is to provide a reflection-type hologram scale and an optical displacement measuring apparatus therewith that solve the above-described problem and that have a holographic grating that allows the displacement of a measurement object to be accurately read without an influence of unnecessary diffraction light against output signal light.

A first aspect of the present invention is a reflection-type hologram scale, comprising a scale substrate formed of a transparent material, a holographic grating formed on a surface of the scale substrate, the holographic grating being formed as a diffraction grating by recording interference fringes in a photosensitive layer deposited on the surface of the scale substrate, a reflection film directly deposited on the holographic grating, and a protection substrate for coating the reflection film.

The protection substrate is for example a plate material adhered to the reflection film on the scale substrate side with adhesive agent. Alternatively, the protection substrate is a protection layer coated on the reflection film on the scale substrate side.

A second aspect of the present invention is an optical displacement measuring apparatus, comprising a light source for radiating a coherent light beam, beam dividing means for dividing the coherent light beam radiated by the light source into two light components, a reflection-type hologram scale for receiving the two light components divided by the beam dividing means, means for guiding two diffraction light beams reflected by the reflection-type hologram scale to the same optical path and causing the beams to interfere with each other, and a light detector for detecting the interference state of the two diffraction light beams, wherein the reflection-type hologram scale has a scale substrate formed of a transparent material, a holographic grating formed on one surface of the scale substrate in such a manner that the light source is disposed over the other surface of the scale substrate, a reflection film directly coated on the holographic grating, and a protection substrate for coating the reflection film.

In the reflection-type hologram scale according to the present invention, a scale substrate is composed of a transparent material. A holographic grating is formed on one surface of the scale substrate in such a manner that a light source and a light detector are disposed over the other surface of the scale substrate. A reflection film is directly formed on the grating surface. Thus, unlike with the conventional apparatus, optical paths of a 0-th order light component and a 1-st order diffraction light component of transmission light of the holographic grating are not separated. Consequently, unnecessary diffraction light is not superimposed on necessary diffraction light as output signal light, whereby unnecessary interference is not occurred. In the reflection-type hologram scale according to the present invention, before a reflection film is formed, interference fringes of two plane waves can be recorded in the state that a hologram photosensitive layer is deposited on a scale substrate. Thus, a holographic grating is formed free of influence of unnecessary reflection light. Consequently, the hologram scale that allows the displacement of a measurement object to be accurately read can be accomplished.

With a displacement measuring apparatus composed of such a reflection-type hologram scale, a coherent light source, and a detector, the displacement of a measurement object can be accurately measured.

These and other objects, features and advantages of the present invention will become more apparent in light of the following detailed description of a best mode embodiment thereof, as illustrated in the accompanying drawing.

DETAILED DESCRIPTION OF THE PREFERRED EMBODIMENTS

Figure 1:
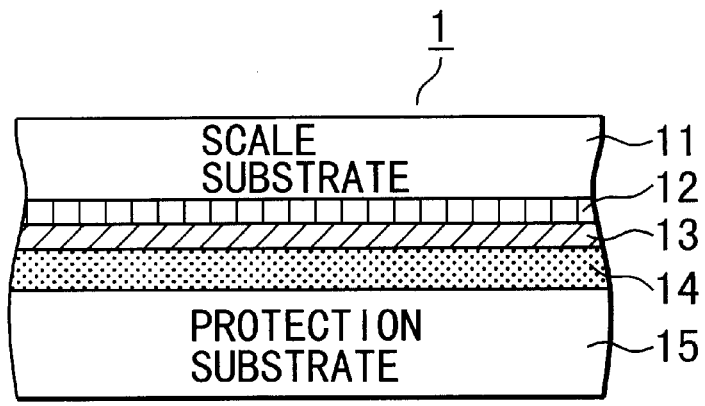
FIG. 1 is sectional view showing the structure of a reflection-type hologram scale according to a first embodiment of the present invention.

As shown in FIG. 1, in a reflection-type hologram scale 1, a holographic grating 12 is formed on one surface of a scale substrate 11. The holographic grating 12 is formed of a photosensitive layer deposited on the scale substrate 11, in which interference fringes are recorded as a diffraction grating. The scale substrate 11 is formed of a transparent material such as glass or resin. A light source and a light detector are disposed on the other surface of the scale substrate 11. A reflection film 13 is directly formed on a grating surface of the holographic grating 12. The reflection film 13 is a metal film of which a metal is sputtered or evaporated. A protection substrate 15 is adhered on the reflection film 13 of the scale substrate 11 with adhesive agent 14. The protection substrate 15 is composed of any plate material.

In the reflection-type hologram scale 1 according to the first embodiment of the present invention, a hologram photosensitive layer is formed on the scale substrate 11. Before the reflection film 13 is formed, interference fringes of two plane waves are recorded to the hologram photosensitive layer so as to form the holographic grating 12.

Thus, when the holographic grating 12 is formed, the above-mentioned unnecessary interference fringes are not recorded. Consequently, the holographic grating 12 can be accurately formed.

In the reflection-type hologram scale 1 according to the first embodiment, since the holographic grating 12 contacts the reflection film 13, when coherent light is radiated from the scale substrate 11 side to the holographic grating 12, a 0-th order light component and 1-st order diffraction light component of transmission light of the holographic grating 12 are reflected through the same optical path and returned to the holographic grating 12, not separated through different optical paths. In other words, the reflection-type hologram scale 1 can be treated as one reflection-type diffraction grating. Thus, the reflection-type hologram scale 1 is free of interference of unnecessary diffraction light. When the scale is moved, the diffraction efficiency is constant. In addition, since the reflection-type hologram scale 1 is free of unnecessary phase changes, it allows the displacement of a measurement object to be accurately read.

Figure 2:
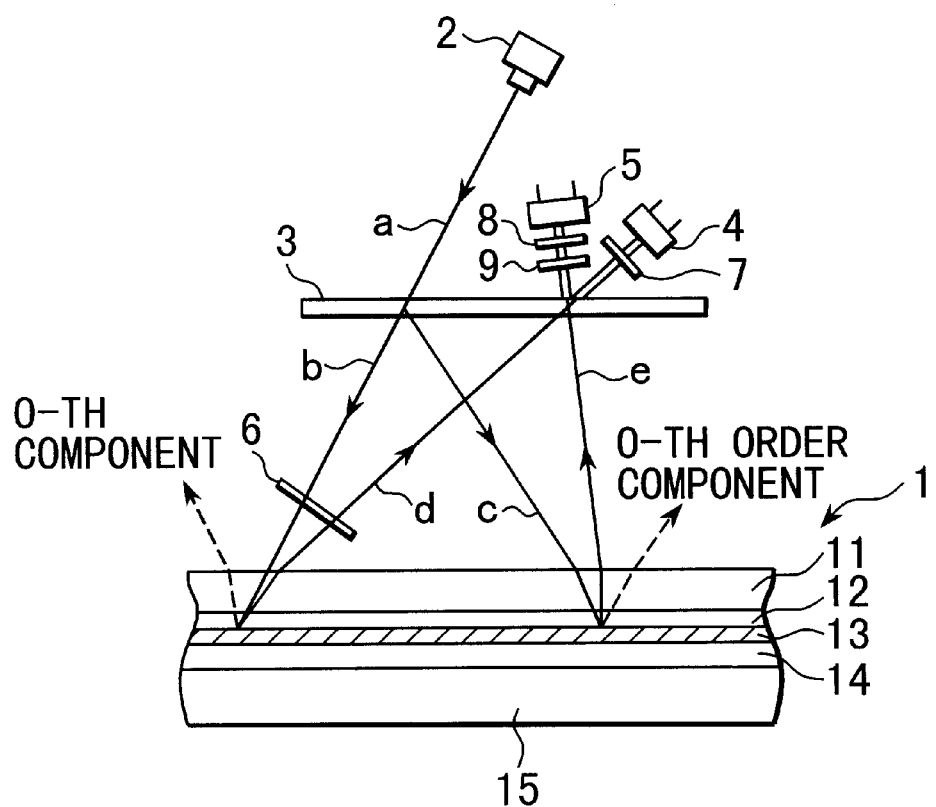
FIG. 2 is a schematic diagram showing an example of a displacement measuring apparatus using the scale according to the first embodiment.

FIG. 2 shows an example of the structure of a displacement measuring apparatus using the reflection-type hologram scale 1 according to the first embodiment of the present invention. As an example of the coherent light source, a laser diode (LD) 2 is used. The LD 2 is disposed over the second surface of the reflection-type hologram scale 1 along with photodiodes 4 and 5. A reflection film 13 is formed on the first surface of the hologram scale 1. A transmission-type diffraction grating 3 is disposed between the LD2 (and the photodiodes 4 and 5) and the hologram scale 1. The transmission-type diffraction grating 3 divides the incident light beam into two light components and combines the diffracted light beams. The grating constant of the diffraction grating 3 is the same as that of the reflection-type hologram scale 1.

A beam "a" radiated from the LD 2 is divided into two beams "b" and "c" by the diffraction grating 3. The two beams "b" and "c" are entered into the reflection-type hologram scale 1. The beams "b" and "c" are a 0-th order light component (transmission light) and a 1-st order diffraction light component of the diffraction grating 3, respectively. A λ/4 plate is disposed on one of the optical paths of the beams "b" and "c". When the two beams "b" and "c" are entered into the reflection-type hologram scale 1, since the reflection-type hologram scale 1 is treated as one reflection-type grating as described above, the beams "b" and "c" are divided into 1-st order diffraction light components "d" and "e" and 0-th order reflection light components denoted by dashed lines.

The light beam "d" is re-entered into the diffraction grating 3 through the λ/4 plate 6. The other light beam "e" is directly entered to nearly the same position of the diffraction grating 3. The λ/4 plate 6 causes the polarizing angles of the light beams "b" and "e" divided by the diffraction grating 3 to vary. Thus, when one of the light beams "d" and "e" reflected by the hologram scale 1 is vertically polarized light, the other light beam is horizontally polarized light. Consequently, the two diffraction light beams "d" and "e" are prevented from interfering before entered into the polarizing plates 7 and 8.

Since the diffraction grating 3 transmits the light beam "d" and diffracts the light beam "e", the transmission light component of the optical beam "d" and the 1-st order diffraction light component of the light beam "e" overlap on the same optical path and enter a polarizing plate 7 disposed on the front surface of the photodiode 4. Thus, the transmission light component of the light beam "e" and the 1-st order diffraction light component of the light beam "d" interfere with each other. Consequently, as the scale is moved, modulated interference light is received. Likewise, the transmission light component of the light beam "e" and the 1-st order diffraction light component of the light beam "d" overlap on the same optical path and enter a polarizing plate 8 disposed on the front surface of the photodiode 5. Thus, the transmission light component of the light beam "e" and the 1-st order diffraction light component of the light beam "d" interfere with each other.

In addition, a λ/4 plate 9 is disposed on the front surface of the polarizing plate 8 that faces the photodiode 5. The λ/4 plate 9 causes the phases of the light beams that enter the two photodiodes 4 and 5 to vary by 90 degrees so as to obtain two electric signals whose phases deviate by 90 degrees from the two photodiodes 4 and 5. By processing the two electric signals, the direction of displacement can be detected. In addition, by interpolating the signals, the resolution can be improved.

As described above, in the reflection-type hologram scale 1 according to the first embodiment, no adhesive agent layer is disposed between the holographic grating 12 and the reflection film 13. Thus, the problem of the unequalness of the adhesive agent layer in the longitudinal direction of the scale does not take place. In addition, unnecessary interference fringes are not recorded on the holographic grating 12. Thus, the displacement of a measurement object can be accurately read.

In the structure shown in FIG. 2, conditions are set so that the light beams "b" and "c" divided by the diffraction grating 3 enter the hologram scale 1 at different incident angles so as to prevent the light beams reflected by the scale from being returned to the LD 2.

Figure 3:
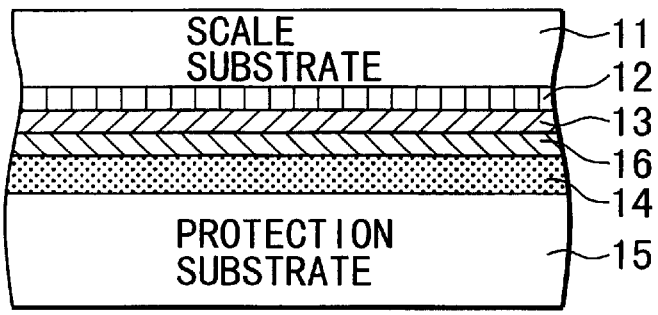
FIG. 3 is a sectional view showing the structure of a reflection-type hologram scale according to a second embodiment of the present invention.

FIG. 3 shows the structure of a reflection-type hologram scale according to a second embodiment of the present invention. Focusing on the difference from the first embodiment, in the second embodiment, after a holographic grating 12 and a reflection film 13 are formed on a scale substrate 11, a protection film 16 is formed on the surface of the reflection film 13. Thus, the reflection film 13 can be prevented from scratching and contaminating in the process of the adhesive layer 14 is coated.

Figure 4:
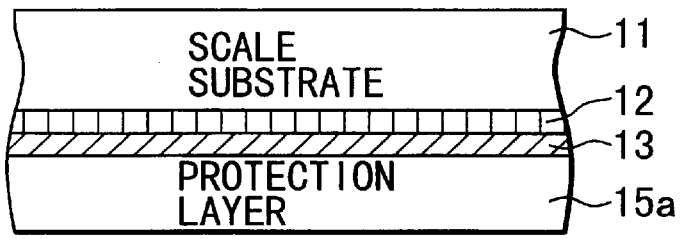
FIG. 4 is a sectional view showing the structure of a reflection-type hologram scale according to a third embodiment of the present invention.
Figure 5:
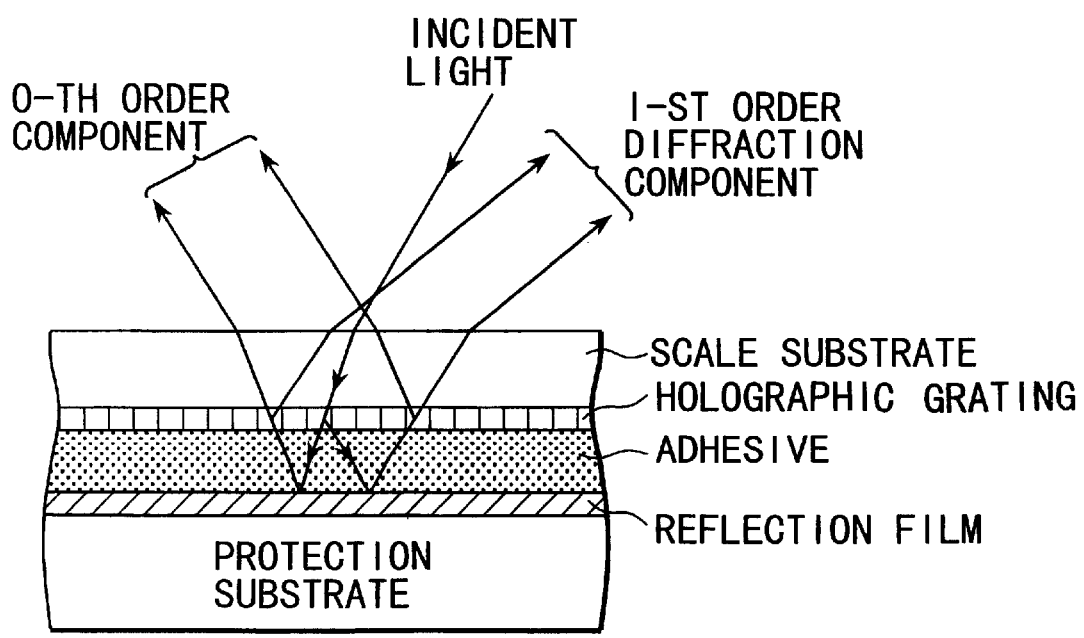
FIG. 5 is a sectional view for explaining a problem on a conventional reflection-type hologram scale.
Figure 6:
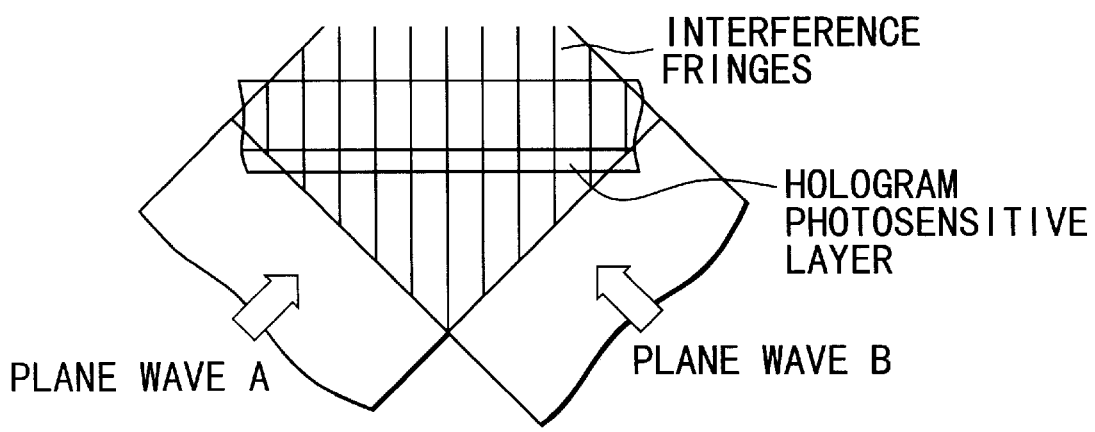
FIG. 6 is a schematic diagram for explaining a theory of a holographic grating.
Figure 7:
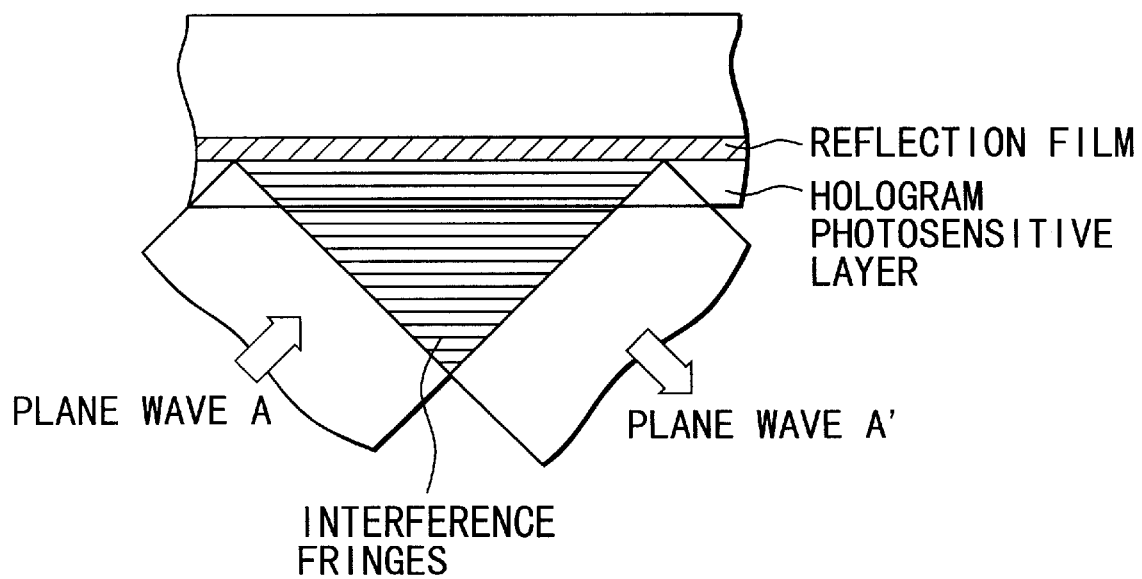
FIG. 7 is a schematic diagram for explaining a problem on a holographic grating of a conventional reflection-type hologram scale.

FIG. 4 shows the structure of a reflection-type hologram scale according to a third embodiment of the present invention. In the third embodiment, as a protection substrate 15a, a coat-type protection layer such as a resin layer or SOG (Spin On Glass) is used instead of a plate material.

According to the third embodiment, since the plate substrate is omitted, a thin-type scale can be accomplished. In addition, the scale can be easily fabricated.

As described above, according to the present invention, a reflection-type hologram scale and an optical displacement measuring apparatus that are free of unnecessary diffraction light against output signal light and that allow a holographic grating to be accurately formed can be provided.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reflection-type hologram scale, comprising:

a scale substrate formed of a transparent material;

a holographic grating formed on a surface of the scale substrate, the holographic grating being formed as a diffraction grating by recording interference fringes in a photosensitive layer deposited on the surface of the scale substrate;

a reflection film directly deposited on the holographic grating; and a protection substrate for coating the reflection film.

2. The reflection-type hologram scale as set forth in claim 1, wherein the protection substrate is a plate material adhered to the reflection film on the scale substrate with adhesive agent.

3. The reflection-type hologram scale as set forth in claim 1, wherein the protection substrate is a protection layer deposited on the reflection film on the scale substrate.

4. An optical displacement measuring apparatus, comprising:

a light source for radiating a coherent light beam;

beam dividing means for dividing the coherent light beam radiated by the light source into two light components;

a reflection-type hologram scale for receiving the two light components divided by the beam dividing means;

means for guiding two diffraction light beams reflected by the reflection-type hologram scale to the same optical path and causing the beams to interfere with each other; and a light detector for detecting the interference state of the two diffraction light beams, wherein the reflection-type hologram scale has:

a stale substrate composed of a transparent material, a holographic grating formed on one surface of the scale substrate in such a manner that the light source is disposed over the other surface of the scale substrate, a reflection film directly coated on the holographic grating, and a protection substrate for coating the reflection film.

* * * * *

UNITED STATES PATENT AND TRADEMARK OFFICE
CERTIFICATE OF CORRECTION

PATENT NO. : 6,115,153
DATED : September 5, 2000
INVENTOR(S) : Masaki TOMIYA et al.

It is certified that error appears in the above-indentified patent and that said Letters Patent is hereby corrected as shown below:

Title page, Change "[75] Inventors: Masaki TOMITA; Motohiro Osaki; Kuniaki Obata; Masaaki Miyashita. all of Kawasaki, Japan."

to --[75] Inventors: Masaki TOMIYA; Motohiro Osaki; Kuniaki Obata; Masaaki Miyashita. all of Kawasaki, Japan.--

Signed and Sealed this

Twenty-fourth Day of April, 2001

*Attest:*

NICHOLAS P. GODICI

*Attesting Officer*   *Acting Director of the United States Patent and Trademark Office*